Aug. 3, 1948. W. T. HANCOCK 2,446,280
INTERNAL-COMBUSTION ENGINE
Filed April 16, 1945
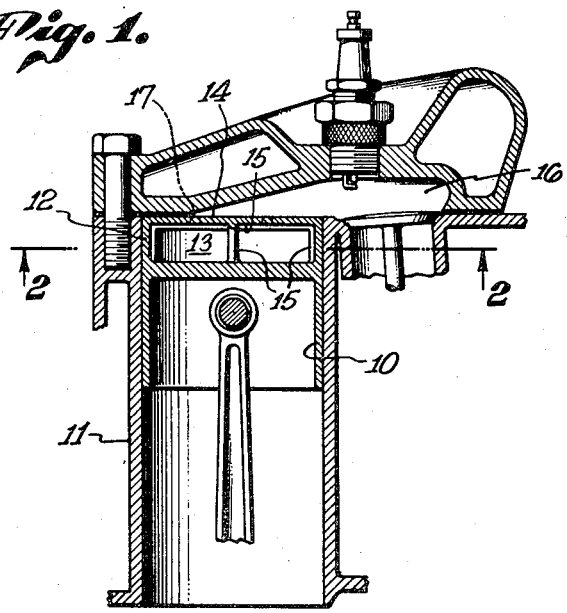
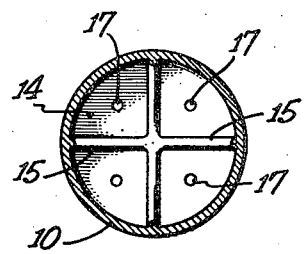
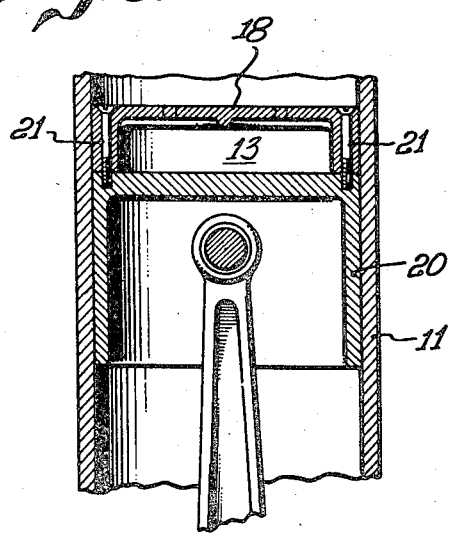
WILLIAM T. HANCOCK,
INVENTOR.
BY
ATTORNEY.

Patented Aug. 3, 1948

2,446,280

UNITED STATES PATENT OFFICE 2,446,280

INTERNAL-COMBUSTION ENGINE

William T. Hancock, Long Beach, Calif.

Application April 16, 1945, Serial No. 588,524

6 Claims. (Cl. 123—193)

This invention has for its ultimate object the suppression of detonation in internal combustion engines, and the effecting of resultant efficiency in engine operation. More specifically, the invention relates to an improved type and form of piston having self-contained means for so controlling the progress of fuel combustion in the cylinder as to result in the accomplishment of these objects.

It is considered, generally speaking, that engine detonation and loss of potential power are caused by improper progression of fuel combustion or defective flame propagation in the cylinder during the power stroke of the piston. Detonation appears to result from initial burning of the entire fuel charge in premature relation to the more ideal condition under which the fuel combustion would occur, at least with greater uniformity, during or substantially throughout the power stroke of the piston. That is to say, the conditions of combustion may be such, particularly with a low octane value fuel, that actual burning of substantially all, or the preponderately greater portion of the charge, occurs early in the piston power stroke, thus creating an absence of continued combustion toward the end of the stroke and causing a falling off of energy resulting in so-called knocking or detonation.

One of my major purposes is to so lengthen, with relation to the piston power stroke, the development of power in the cylinder, as to utilize to better advantage the potential energy of the fuel, and in so doing, to obviate detonation that would otherwise occur under similar conditions.

Particularly the invention aims to accomplish this objective by means of the piston itself, and specifically by the provision, in the piston, of an auxiliary chamber into which fuel is compressed during the compression stroke of the piston and at the time of the main fuel charge compression in the cylinder, and from which its contained fuel is released in a manner permitting it to supply the usual energy deficiencies during the advanced portion of the piston travel.

In accordance with the invention the piston is made to contain a substantially closed head chamber having only restricted communication with the cylinder combustion chamber, preferably through openings in the piston head that are sufficiently large to permit compression of a proper portion of the fuel charge into the piston chamber, and sufficiently small to inhibit or prevent combustion of all or any major portion of this auxiliary charge while in the piston chamber. Throughout the piston power stroke, the charge previously compressed into the piston chamber is released into the cylinder chamber as its pressure decreases, and complete combustion of the entire fuel charge is thus delayed and extended in more efficient relation to the piston travel.

Inspections of the chambers in test pistons that have been in operation over extended periods, have failed to disclose carbon accumulations in the chambers. Accordingly, it is assumed that at least no considerable combustion has occurred in the chamber. Whatever the exact conditions may be, the effect is to materially increase the engine efficiency, as will later appear.

For further details, reference is had to the accompanying drawing illustrative of the invention in certain typical embodiments. In the drawing:

Fig. 1 is a sectional view, diagrammatic in parts, showing the piston in a conventional engine cylinder;

Fig. 2 is a cross-section on line 2—2 of Fig. 1; and

Fig. 3 is a fragmentary view illustrating a variational form of the piston.

In Fig. 1 the piston 10 is shown to be at the end of its compression stroke within the cylinder 11, the illustration of the piston being general and lacking in certain details irrelevant to the essence of the invention, such as the provision of piston rings which may be accommodated as desired within the length of the piston. The latter is suitably made to contain a hollow or chambered head 12, and in the form of the invention shown in Fig. 1, the piston is made as a single casting containing the head chamber 13. Referring to Fig. 2, the end 14 of the piston may be suitably re-enforced, as by integrally cast ribs 15.

The piston chamber 13 is in communication with the cylinder or combustion chamber 16 through restricted passage means in the end 14 of the piston, formed for example by small openings 17 between the ribs 15. As previously indicated, it is considered that in the aggregate, the areas of openings 17 shall be sufficiently large to permit compression of a portion of the fuel charge to chamber 13 during the compression stroke of the piston, to a chamber pressure corresponding substantially to the maximum compression pressure in chamber 16. Individually, however, the openings 17 may be sufficiently small to inhibit or prevent flame propagation, upon ignition of the charge in chamber 16, into the piston chamber, the object being to maintain all or a portion of the charge in chamber 13 in unburned condition for release into chamber 16 during or throughout the power stroke of the piston.

Merely as illustrative, in an engine having a 5.5 to 1 compression ratio and using a three inch piston, successful results have been obtained by providing in the end of the piston four holes 17 each $\frac{3}{32}$ inch in diameter. In a typical run using 70 octane number gasoline at a compression pressure of 92 pounds per square inch gage (with a ratio of about 100 to 40 between the combustion chamber volume at the end of the piston stroke, and the piston chamber), an increase of ten to twelve in octane number was obtained over the corresponding rating obtained using a conventional piston operating in the same engine under corresponding conditions and with the same fuel. The results further showed an apparent advantage of about 0.5 in the compression ratio by virtue of the present improved piston.

As will be understood from what has been said in the foregoing, throughout the compression stroke of the piston, a portion of the fuel charge is progressively compressed through openings 17 into the chamber 13. During the power stroke of the piston, the mixture in the piston chamber is progressively discharged into the cylinder at a rate at least generally corresponding to the rate or value of pressure drop in the cylinder. The discharge from the piston chamber occurs throughout the power stroke of the piston until a pressure balance is reached inside and outside the chamber 13, which condition may be established substantially upon the opening of the exhaust valve.

The variational form of the invention shown in Fig. 3 is similar in all respects to the described embodiment except that the piston chamber is contained within a detachable head 18, here shown to be secured to the body 20 of the piston by screws 21.

It will be understood that the number and size of the gas passing openings in the piston head may be varied as desired, to give adequate total gas passing area for the charge flow into the piston chamber, and an individual orifice size that will suppress flame propagation into the piston chamber.

I claim:

1. The combination comprising a combustion engine cylinder, means for supplying a preformed charge of mixed fuel and air to the cylinder, a piston in said cylinder containing a chamber adapted to receive through restricted passage means a compressed portion of the gaseous fuel charge from the cylinder chamber during the compression stroke of the piston, said portion of the fuel charge being released through said passage means from the piston chamber into the cylinder chamber during the power stroke of the piston.

2. The combination comprising a combustion engine cylinder, means for supplying a preformed charge of mixed fuel and air to the cylinder, a piston in said cylinder containing a chamber adapted to receive through restricted passage means a compressed portion of the gaseous fuel charge from the cylinder chamber during the compression stroke of the piston, said portion of the fuel charge being released through said passage means from the piston chamber into the cylinder chamber throughout substantially the entire portion of the power stroke of the piston during which the cylinder chamber pressure reduces to atmospheric pressure from a pressure corresponding substantially to the pressure to which the fuel charge is compressed in the piston chamber.

3. The combination comprising a combustion engine cylinder, means for supplying a preformed charge of mixed fuel and air to the cylinder, a piston in said cylinder containing a chamber, there being in the piston a plurality of restricted passages through which a portion of the cylinder chamber fuel charge is compressed into the piston chamber during the compression stroke of the piston, fuel being released through said restricted passage means into the cylinder during the power stroke of the piston.

4. The combination comprising a combustion engine cylinder, means for supplying a preformed charge of mixed fuel and air to the cylinder, a piston in said cylinder containing a chamber, restricted passage means in the piston through which a portion of the cylinder chamber fuel charge is compressed into the piston chamber during the compression stroke of the piston, fuel being released unburned through said restricted passage means into the cylinder during the power stroke of the piston at a rate sufficiently slow to increase substantially the fuel combustion in the cylinder chamber toward the end of the piston stroke over the combustion that would occur in the absence of such fuel release from the piston chamber.

5. The combination comprising a combustion engine cylinder, means for supplying a preformed charge of mixed fuel and air to the cylinder, a piston in said cylinder containing a chamber, a restricted passage means in the piston through which a portion of the cylinder chamber fuel charge is compressed into the piston chamber during the compression stroke of the piston, at least the greater part of said portion of the fuel charge being released unburned through said restricted passage means into the cylinder during the power stroke of the piston, said passage means being sufficiently restricted to prevent explosion of the fuel in the piston chamber.

6. The combination comprising a combustion engine cylinder, means for supplying a preformed charge of mixed fuel and air to the cylinder, a piston in said cylinder containing in the head thereof a chamber adapted to receive through a plurality of restricted passages in the end of the piston a compressed portion of the fuel charge from the cylinder chamber during the compression stroke of the piston, said passage means being sufficiently restricted to prevent fuel explosion in the piston chamber and cause said portion of the fuel charge to be released into the cylinder chamber during an extended portion of the piston power stroke.

WILLIAM T. HANCOCK.

REFERENCES CITED

The following references are of record in the file of this patent:

UNITED STATES PATENTS

| Number | Name | Date |
|---|---|---|
| Re. 10,250 | Parker | Feb. 20, 1883 |
| 1,707,052 | Decker et al. | Mar. 26, 1929 |
| 1,803,263 | Lang | Apr. 28, 1931 |
| 1,811,771 | Wiemann | June 23, 1931 |
| 1,825,658 | Dumanois | Oct. 6, 1931 |
| 1,942,206 | Evelyn | Jan. 2, 1934 |

FOREIGN PATENTS

| Number | Country | Date |
|---|---|---|
| 734,043 | France | Oct. 14, 1932 |